Aug. 7, 1934.  W. M. CROSS  1,969,502
PROCESS FOR TREATING HYDROCARBON OILS
Filed Sept. 1, 1926
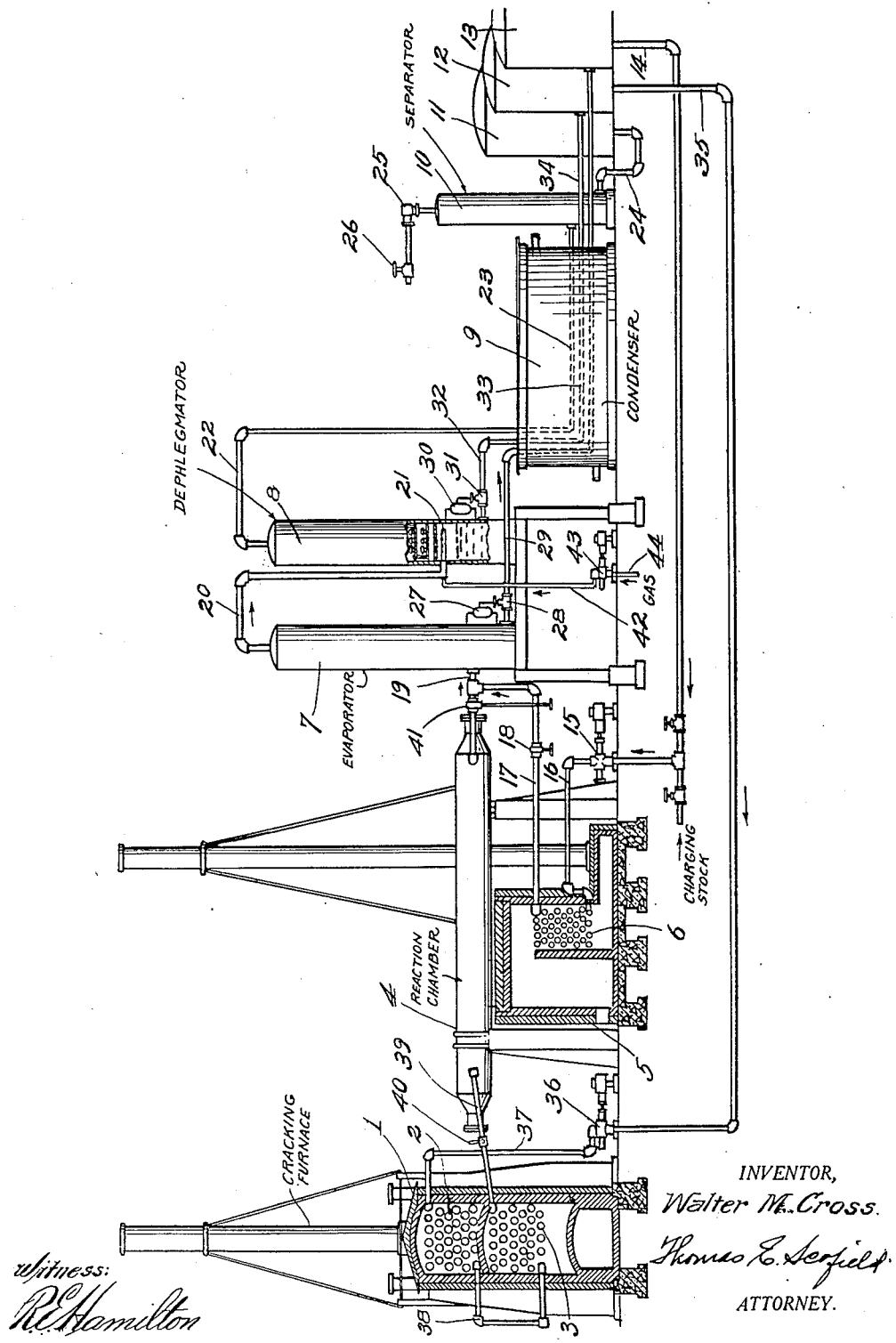
INVENTOR,
Walter M. Cross.
Thomas E. Serfield
ATTORNEY.
Witness:
R. E. Hamilton Patented Aug. 7, 1934

1,969,502

UNITED STATES PATENT OFFICE 1,969,502

PROCESS FOR TREATING HYDROCARBON OILS

Walter M. Cross, Kansas City, Mo., assignor, by mesne assignments, to Gasoline Products Company, Inc., Wilmington, Del., a corporation of Delaware Application September 1, 1926, Serial No. 132,976

10 Claims. (Cl. 196—97)

This invention relates to improvements in a process for treating hydrocarbon oils, and refers primarily to a method of purifying the oil vapors in the refluxing or dephlegmating stage by introducing thereto an extraneous gas or air or any medium which will act with the vapors to fractionate out the polymers from the oil vapors, thereby improving the quality of the final distillate obtained.

The single figure is a diagrammatic side elevational view with parts in section.

Referring to the drawing, at 1 is shown a furnace in which are positioned the banks of coils 2 and 3. The furnace is preferably heated by means of gas burners not shown. Four (4) is a heavily insulated reaction chamber made from a single ingot of forged steel with removable end plates to facilitate cleaning. Five (5) is a second furnace in the tube chamber of which is positioned the bank of coils 6. At 7 is shown an evaporator and at 8 is a bubble tower, the lower portion of which has been broken away to show the interior structure. The tank-like element 9 is a condenser which is water-cooled,—water being continuously circulated therethrough. The narrow tank 10 is a gas separator and 11, 12 and 13 are storage tanks.

The plant shown is particularly adapted for the treatment of relatively heavy oil, such as fuel oil, which is supplied from the tank 13 through the line 14 and is charged by means of a pump 15 through line 16 to the pipe still 6 where it is raised to a proper evaporation temperature. The furnace 5 is heated by gas burners not shown. The oil, on being discharged from the pipe still, is introduced through the line 17 controlled by a valve 18 to the transfer line 19 and thence into the evaporator 7 where the vapors are separated off, passing overhead through the vapor line 20 and into the lower portion of the dephlegmator by means of a perforated rose or spray pipe 21. In the bubble tower the vapors are given the usual dephlegmating treatment, coming in contact with a gravitating condensate, the uncondensed vapors passing overhead through the line 22 and through the condenser coil 23 in the condenser box 9, the distillate passing to the gas separator and thence through the line 24 to the distillate storage tank 11, the gas separated in the separator 10 being drawn off through the line 25 controlled by a valve 26 and directed to storage or for fuel in the furnaces 1 and 5.

The unvaporized material collecting in the bottom of the evaporator is automatically withdrawn by means of a liquid level regulating device 27 manipulating a valve 28 in the draw off line 29 which conducts the oil from the bottom of the evaporator to the fuel oil storage tank 13, where it may be recycled through the line 14 to the pipe still or withdrawn to separate storage or for marketing as fuel oil.

The reflux condensate which gravitates downwardly through the bubble tower 8, collects in a pool in the bottom of the tower and is automatically withdrawn by means of the liquid level regulating device 30, manipulating the valve 31 in the draw off line 32. This reflux material is cooled in the condenser box, passing therethrough in a coil 33 and thence through a line 34 to the tank 12. A return pipe 35 from the tank 12 furnishes a means for recycling the condensate withdrawn from the bubble tower back to a pump 36 which charges it through the line 37 to the coils 2 positioned in the top of the furnace from which the oil, after being preheated, passes by the transfer line 38 to the lower set of coils 3, thence through a transfer line 39 to the reaction chamber 4. In the heating coils, the oil is circulated at high velocity and heated to a cracking temperature,—the heating operation being so controlled that any considerable deposition of carbon in the coils is prevented. In the transfer line 39 is a valve 40.

The heated oil from the coils 2 and 3 at a cracking temperature is passed to the enlarged zone 4 where the cracking instituted in the coils is completed as a result of the time factor during which period the oil is maintained in a relatively large body at a cracking temperature. The pressure upon the coils and reaction chamber is maintained sufficiently high to prevent, insofar as possible, vaporization of the oil. Certain of the lighter fractions having a critical temperature below this temperature will be more or less in the vapor phase. After reaction in the chamber 4, the oil is withdrawn through the line 19 and the pressure reduced at the valve 41.

In the transfer line 19 the cracked products discharged from the reaction chamber and the heated oil from the pipe still 6 are blended and the combined materials discharged into the evaporator where vapors are separated from the blended oil. The vapors as described pass overhead, are dephlegmated in the tower 8 and the uncondensed material finally condensed in the water cooled tank 9 and after gas separation in the element 10, pass to the distillate storage tank 11.

Connected into the vapor line 20, just prior to the point at which it enters the tower 8, is a line 42 which communicates with the discharge from the pump 43. By means of this pump, air or gas supplied through the suction line 44 may be pumped in regulated quantities into the vapor line just prior to the point at which it enters the tower. In place of putting this gas or air into the vapor line, it may, as well, be introduced directly to the tower,—the construction shown being just merely a matter of convenience. The purpose of introducing air or other gases, such as ozone, stack gases, hydrogen, carbon monoxide, sulphur dioxide, or other gaseous materials which act chemically with the oil vapors to fractionate out the polymers, is to purify and improve the qualities of the final distillate, eliminating considerably the necessary treatment to make the distillate marketable as motor fuel.

By introducing a gas at this juncture a chemical action is brought about between the hydrocarbon vapors and the gas which increases considerably the separation of the polymers in the trays of the bubble tower and these polymers, either in solution or in suspension, gravitate downwardly with the condensate and are drawn off from the lower pool of the bubble tower with the liquid oil. Subsequently, they may be collected as settlings in the storage tank 12 or may pass on and be retreated with the cracking stock in the cracking end of the system. If this occurs, normally they will be separated out with the carbon and other solid or semi-solid material in the reaction chamber from which they may be easily cleaned.

While the introduction of gas has been shown in a combined pipe still and cracking system, it may, as well, be used in a separate cracking unit or in normal pipe still operation to improve the characteristics and properties of the overhead materials.

I claim as my invention:

1. A method of separating polymerized material from hydrocarbon vapors comprising subjecting the vapors together with an unheated oxidizing gas to reflux action in a dephlegmating tower in which the vapors are subjected only to dephlegmating action of fractions condensed therefrom.

2. A process for treating hydrocarbon oils comprising heating the oil, passing the heated oil into a zone of lower pressure to evaporate the oil, introducing the vapors in a reflux tower, introducing an oxidizing gas directly into said reflux tower, and subjecting the vapors and gas to the action of reflux condensate to effect reaction between the oxidizing gas and the vapors and reflux condensate to separate polymerized material therefrom.

3. A process for treating hydrocarbon oils comprising heating the oil, passing the heated oil into a zone of lower pressure to evaporate the oil, introducing the vapors together with an oxidizing gas into a reflux tower, and subjecting the vapors and gas to the action of reflux condensate to effect reaction between the oxidizing gas and the vapors and reflux condensate to separate polymerized material therefrom, removing reflux condensate together with the separated polymerized material from the tower, heating the same to incipient conversion, passing the heated oil to a reaction zone wherein conversion is consummated and the separated polymerized material is deposited.

4. A process for treating hydrocarbon oils comprising heating the oil, passing the heated oil into a zone of lower pressure to evaporate the oil, introducing the vapors together with an oxidizing gas into a reflux tower, subjecting the vapors and gas to the action of reflux condensate to effect reaction between the oxidizing gas and the vapors and reflux condensate to separate polymerized material therefrom, removing reflux condensate together with the separated polymerized material from the tower, heating the same to incipient conversion, passing the heated oil to a reaction zone wherein conversion is consummated and the separated polymerized material is deposited, and mixing the products of conversion with the heated oil prior to introducing the same into the zone of low pressure.

5. A process of treating hydrocarbons comprising charging oil of relatively different molecular weights to separate stages of treatment, subjecting the oil in one stage to a temperature sufficient to distill off a major portion thereof without substantial cracking, subjecting the oil in the other stage to conditions of temperature and pressure regulated to produce cracking substantially in the liquid phase, blending the oils from the separate stages and distilling off the volatile portions of the combined oils under substantially atmospheric pressure in a separate vaporizing stage, subjecting the vaporized portions to a refluxing action in the presence of a gas capable of acting with the vapors to separate polymerized material therefrom, and thence to a final condensing action, mixing the refluxed products with the charging stock and directing the same to the cracking stage and mixing the unvaporized products from the vaporizing stage with the charging stock supplied to the distillation stage.

6. A process of treating hydrocarbon oils, comprising the steps of vaporizing the oil, subjecting the vapors to a refluxing action in a dephlegmating tower, and adding air directly to said dephlegmating tower to accelerate the separation of polymerized material from the vapors.

7. A process of treating hydrocarbon oils, comprising the steps of vaporizing the oil, subjecting the vapors to a refluxing action in a dephlegmating tower, and adding oxidizing gas directly to said dephlegmating tower to accelerate the separation of polymerized material from the vapors.

8. The process of treating hydrocarbon oils, comprising the steps of subjecting the oil to cracking, vaporizing the volatile products, subjecting the vapors to a refluxing action in a dephlegmating tower, and accelerating the separation of polymerized material from the vapors undergoing dephlegmation by directly introducing an oxidizing medium into the said dephlegmating tower.

9. In the art of treating relatively high boiling hydrocarbon oils for the production of relatively low boiling distillate oils wherein a hydrocarbon oil is maintained at cracking temperature to effect substantial conversion of the oil into desired low boiling products, said low boiling products being withdrawn in vapor form after completion of the desired conversion, the said vapors being thereafter dephlegmated to condense and separate therefrom undesired high boiling constituents, and the remaining vapors being finally condensed to form the desired low boiling distillate product, the step of refining said desired low boiling products which comprises intimately contacting the said vapors with an oxidizing gas introduced directly into the vapors during the dephlegmation thereof.

10. In the art of treating relatively high boiling hydrocarbon oils for the production of relatively low boiling distillate oils wherein a hydrocarbon oil is maintained at cracking temperature to effect substantial conversion of the oil into desired low boiling products, said low boiling products being withdrawn in vapor form after completion of the desired conversion, the said vapors being thereafter dephlegmated to condense and separate therefrom undesired high boiling constituents, the remaining vapors being finally condensed to form the desired low boiling distillate products, and the condensed undesired constituents being returned to the oil undergoing conversion, the step of refining said desired low boiling products which comprises intimately contacting the said vapors with an oxidizing gas introduced directly into the vapors during the dephlegmation thereof.

WALTER M. CROSS.